United States Patent
Onno et al.

(10) Patent No.: US 6,891,895 B1
(45) Date of Patent: May 10, 2005

(54) DEVICE AND METHOD FOR TRANSFORMING A DIGITAL SIGNAL

(75) Inventors: Patrice Onno, Rennes (FR); Eric Majani, Rennes (FR); Bertrand Berthelot, Rennes (FR); James Philip Andrew, Waverton (AU); Paul Raymond Higginbottom, Castle Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/542,920

(22) Filed: Apr. 4, 2000

(30) Foreign Application Priority Data

Apr. 15, 1999 (FR) .............................................. 99 04747

(51) Int. Cl.⁷ ............................ H04K 1/10; H04L 27/28
(52) U.S. Cl. .................. 375/260; 375/259; 375/240.11; 375/240.19
(58) Field of Search ................................ 375/259, 260, 375/275, 240.11, 240.19, 240

(56) References Cited

U.S. PATENT DOCUMENTS

| | | | | | |
|---|---|---|---|---|---|
| 5,822,373 | A | * | 10/1998 | Addy ......................... | 375/259 |
| 6,167,190 | A | * | 12/2000 | Nagasawa .................... | 386/111 |
| 6,483,946 | B1 | * | 11/2002 | Martucci et al. ............ | 382/240 |
| 6,487,318 | B1 | * | 11/2002 | Cho .......................... | 382/240 |
| 6,501,860 | B1 | * | 12/2002 | Charrier et al. ............. | 382/240 |
| 6,760,482 | B1 | * | 7/2004 | Taubman ..................... | 382/240 |

FOREIGN PATENT DOCUMENTS

| | | | | |
|---|---|---|---|---|
| EP | 1033880 | * | 9/2000 | .......... H04N/7/167 |
| WO | 97/16028 | | 5/1997 | |
| WO | 97/18527 | | 5/1997 | |

OTHER PUBLICATIONS

C. Chrysafis et al., Line Based, Reduced Memory, Wavelet Image Compression, Data Compression Conference, IEEE Computer Society Press, Apr. 1998, pp. 398–407.

* cited by examiner

Primary Examiner—Temesghen G.
Assistant Examiner—Qutub Ghulamali
(74) Attorney, Agent, or Firm—Fitzpatrick, Cella, Harper & Scinto

(57) ABSTRACT

A digital signal is transformed in at least two different frequency bands according to at least two different resolutions. The signal is divided into first blocks all having the same predetermined first number of samples. Each of the first blocks is transformed into a plurality of second blocks, any second block under consideration having a second respective number of samples which depends on the resolution of the second block under consideration, and containing samples selected according to their frequency. Second blocks issuing from the transformation of different first blocks are grouped in order to form third blocks all having the same predetermined third number of samples which is at least equal to the largest of the second numbers.

34 Claims, 12 Drawing Sheets

DEVICE AND METHOD FOR TRANSFORMING A DIGITAL SIGNAL

BACKGROUND OF THE INVENTION

1. Field of the Invention

The present invention concerns the transformation of a digital signal, such as digital filtering.

2. Description of Related Art

Numerous digital filtering methods and devices are known. Digital signal analysis filterings are envisaged here by way of example. Amongst such filterings, wavelet transformations are more particularly envisaged.

These filterings are generally subassemblies integrated into the coding and/or decoding assemblies. They often require a large amount of random access memory or buffer space for storing the data in the course of processing. For example, for image processing, the most conventional solutions for producing the wavelet transform consist of loading the entire image to be processed into memory and then effecting the different filtering steps. The memory space is then so large that this makes it difficult to implement such filterings in appliances such as photographic appliances, facsimile machines, printers or photocopiers for example.

SUMMARY OF THE INVENTION

The present invention provides a method and a device for transforming a digital signal which minimises the degree to which the data being processed occupy buffer space.

To this end, the invention proposes a method of transforming a digital signal representing a physical quantity, into signals of frequency sub-bands distributed in at least two different frequency bands and in at least two different resolutions, characterised in that it includes steps of:

dividing the signal into first blocks all having a same predetermined first number of samples, transforming each of the first blocks formed at the previous step into a plurality of second blocks, any second block under consideration having a second respective number of samples which depends on the resolution of the second block under consideration, and containing samples selected according to their frequency, grouping second blocks issuing from the transformation of different first blocks in order to form third blocks all having a same predetermined third number of samples which is at least equal to the largest of the second numbers.

By virtue of the invention, the space taken up in the buffer by the data currently being processed is reduced compared with the prior art. Thus powerful filterings can be integrated in numerous appliances, without these requiring very large memories.

According to a preferred characteristic, the transformation is a wavelet transformation.

According to preferred and alternative characteristics, the first blocks overlap in pairs on a predetermined fourth number of samples or the first blocks are adjacent. The overlap between adjacent blocks, for example on a row and/or column, improves the quality of the reconstructed signal after processing.

According to a preferred characteristic, the first blocks are processed in a predetermined order, such that the signal is transformed zone by zone, a zone of the signal being processed at all resolution levels before passing to a following zone. Thus the memory requirements are minimised.

According to another preferred characteristic, the grouping of the second blocks is effected by grouping together second blocks having the same number of samples and samples selected according to the same frequency band. This is because blocks are grouped together having samples of the same nature, so that their subsequent processing is optimised.

According to a preferred characteristic, the digital signal is an image signal. The invention applies advantageously to an image signal, which generally requires a large amount of memory space. This memory space is reduced by virtue of the invention.

The invention also concerns a coding method which includes the characteristics set out above and has the same advantages.

Correlatively, the invention proposes a device for transforming a digital signal representing a physical quantity, into signals of frequency sub-bands distributed according to at least two different frequency bands and according to at least two different resolutions, characterised in that it has;

means of dividing the signal into first blocks all having a same predetermined first number of samples, means of transforming each of the first blocks into a plurality of second blocks, any second block under consideration having a second respective number of samples which depends on the resolution of the second block under consideration, and containing samples selected according to their frequency, means of grouping second blocks issuing from the transformation of different first blocks in order to form third blocks all having a same predetermined third number of samples which is at least equal to the largest of the second numbers.

The device has means of implementing the characteristics set out above.

The invention also concerns a coding device, a digital appliance including the transformation or coding device or means of implementing the transformation or coding method. This digital appliance is for example a digital photographic appliance, a computer, a facsimile machine, a photocopier, a scanner or a printer.

The advantages of the device and of the digital appliance are identical to those set out above.

An information storage means which can be read by a computer or by a microprocessor, integrated or not into the device, possibly removable, stores a program implementing the filtering method.

BRIEF DESCRIPTION OF THE DRAWINGS

The characteristics and advantages of the present invention will emerge more clearly from a reading of a preferred embodiment illustrated by the accompanying drawings, in which.

DETAILED DESCRIPTION OF THE INVENTION

Figure 1:
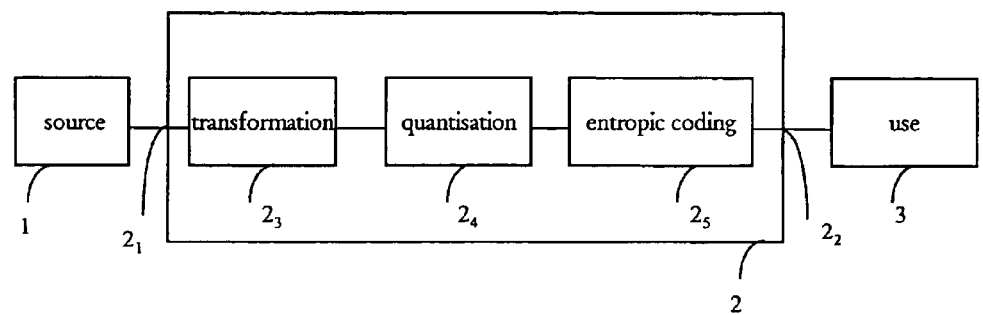
FIG. 1 depicts schematically a data processing device according to the invention.

According to a chosen embodiment depicted in FIG. 1, a data processing device according to the invention is a data coding device 2 which has an input $2_1$ to which a source 1 of uncoded data is connected.

The source 1 has for example a memory means, such as a random access memory, a hard disk, a diskette or a compact disc, for storing uncoded data, this memory means being associated with a suitable reading means for reading the data therein. A means for recording the data in the memory means can also be provided.

It will more particularly be considered hereinafter that the data to be coded are a series of digital samples representing an image IM.

The source 1 supplies a digital image signal SI at the input of the coding circuit 2. The image signal SI is a series of digital words, for example bytes. Each byte value represents a pixel of the image IM, here with 256 grey levels, or black and white image. The image can be a multispectral image, for example a colour image having components in three frequency bands, of the red-green-blue or luminance and chrominance type. Each band is then processed in a similar fashion to the monospectral image.

Means 3 using coded data are connected at the output 22 of the coding device 2.

The user means 3 include for example coded data storage means, and/or coded data transmission means.

The coding device 2 includes conventionally, as from the input $2_1$, a transformation circuit $2_3$, to which the present invention more particularly relates, and an example embodiment of which will be detailed hereinafter. The transformations envisaged here are decompositions into frequency sub-bands signals of the data signal, so as to effect an analysis of signal, i.e., space-frequency transformations of the data signal into the frequency sub-bands signals. The analysis is performed on at least two resolution levels, the resolution of a signal being in general terms the number of samples per unit length which are used for representing the signal.

The transformation circuit 23 is connected to a quantisation circuit 24. The quantisation circuit implements a quantisation known per se, for example a scalar quantisation, or a vector quantisation, of the coefficients, or groups of coefficients, of the frequency sub-band signals supplied by the circuit 23.

The circuit 24 is connected to an entropic coding circuit 25, which effects an entropic coding, for example a Huffman coding, or an arithmetic coding, of the data quantised by the circuit 24.

The coding device can be integrated into a digital appliance, such as a computer, a printer, a facsimile machine, a scanner or a digital photographic apparatus, for example.

Figure 2:
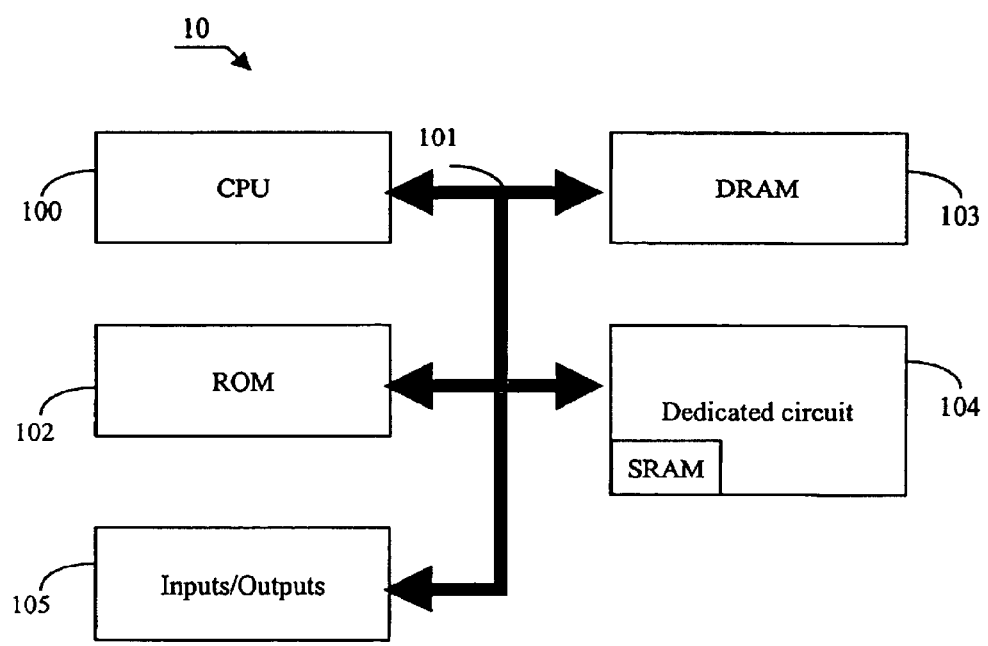
FIG. 2 depicts an embodiment of a data processing device according to the invention.

With reference to FIG. 2, an example of a device 10 implementing the invention is described.

The device 10 is here a microcomputer having a communication bus 101 to which there are notably connected:

a central unit 100, a read only memory 102, a random access memory 103, a dedicated circuit 104 implementing the invention, which will be described hereinafter, an input/output circuit 105.

The device 10 can include, in a conventional fashion, a keyboard or a disk drive adapted to receive a diskette, or can be adapted to communicate with a communication network.

The device 10 can receive data to be coded from a peripheral device, such as a digital photographic apparatus, or a scanner, or any other means of acquiring or storing data.

The device 10 can also receive data to be coded from a distant device, via the communication network, and transmit coded data to a distant device, again via the communication network.

According to the embodiment depicted, the random access memory 103 is a direct-access dynamic memory, known as DRAM, from the English "Dynamic Random Access Memory". This memory is useful in the context of the invention for reading the samples of the image in a particular order, as disclosed below.

The circuit 104 also has a Static Random Access Memory known as SRAM.

In more general terms, the programs according to the present invention are stored in a storage means. This storage means can be read by a computer or by a microprocessor. This storage means is integrated or not into the device, and may be removable. For example, it may have a magnetic tape, a diskette or a CD-ROM (fixed-memory compact disc).

Figure 3:
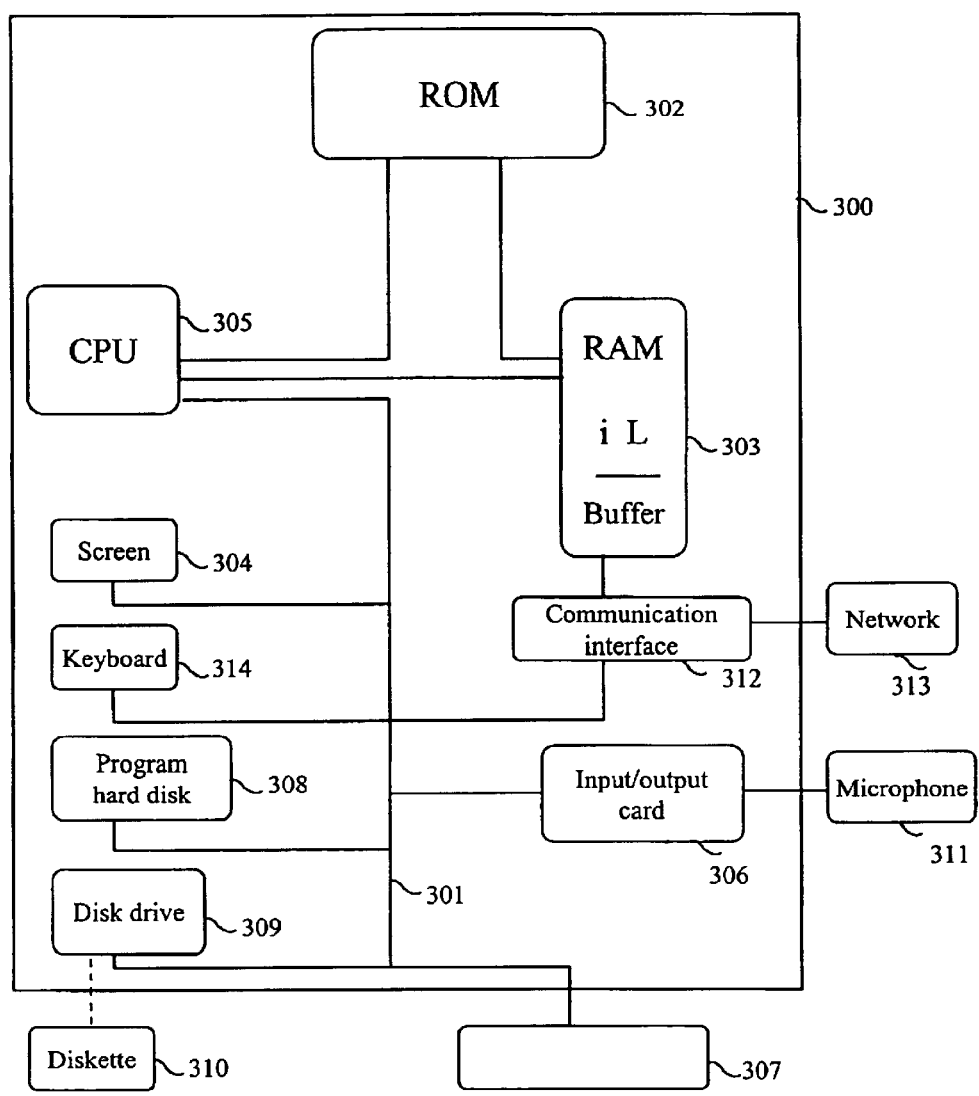
FIG. 3 depicts an embodiment of a data processing device according to the invention.

With reference to FIG. 3, there is described an example of a device 300 implementing the invention. This device is adapted to code and/or decode a digital signal.

The device 300 is here a microcomputer having a communication bus 301 to which there are connected:

a central unit 305, a read only memory 302, a random access memory 303, a screen 304, a keyboard 314, a hard disk 308, a disk drive 309 adapted to receive a diskette 310, an interface 312 for communication with a communication network 313, an input/output card 306 connected to a microphone 311.

The hard disk 308 stores the programs implementing the invention, which will be described hereinafter, as well as the data to be coded and the data coded according to the invention. These programs can also be read on the diskette 310, or received via the communication network 313, or stored in the read only memory 302.

In more general terms, the programs according to the present invention are stored in a storage means. This storage means can be read by a computer or by a microprocessor. This storage means is integrated or not into the device, and may be removable. For example, it may have a magnetic tape, a diskette or a CD-ROM (fixed-memory compact disc).

When the device is powered up, the programs according to the present invention are transferred into the random access memory 303, which then contains the executable code of the invention, and registers containing the variables necessary for implementing the invention. These variables, which will be detailed below, are notably the variables i and L. The random access memory includes a buffer.

The device 300 can receive data to be coded from a peripheral device 307, such as a digital photographic apparatus, or a scanner, or any other means of acquiring or storing data.

The device 300 can also receive data to be coded from a distant device, via the communication network 313, and transmit coded data to a distant device, again via the communication network 313.

The device 300 can also receive data to be coded from the microphone 311. These data are then a sound signal.

The screen 304 enables a user notably to display the data to be coded, and serves, with the keyboard 314, as a user interface.

Figure 4:
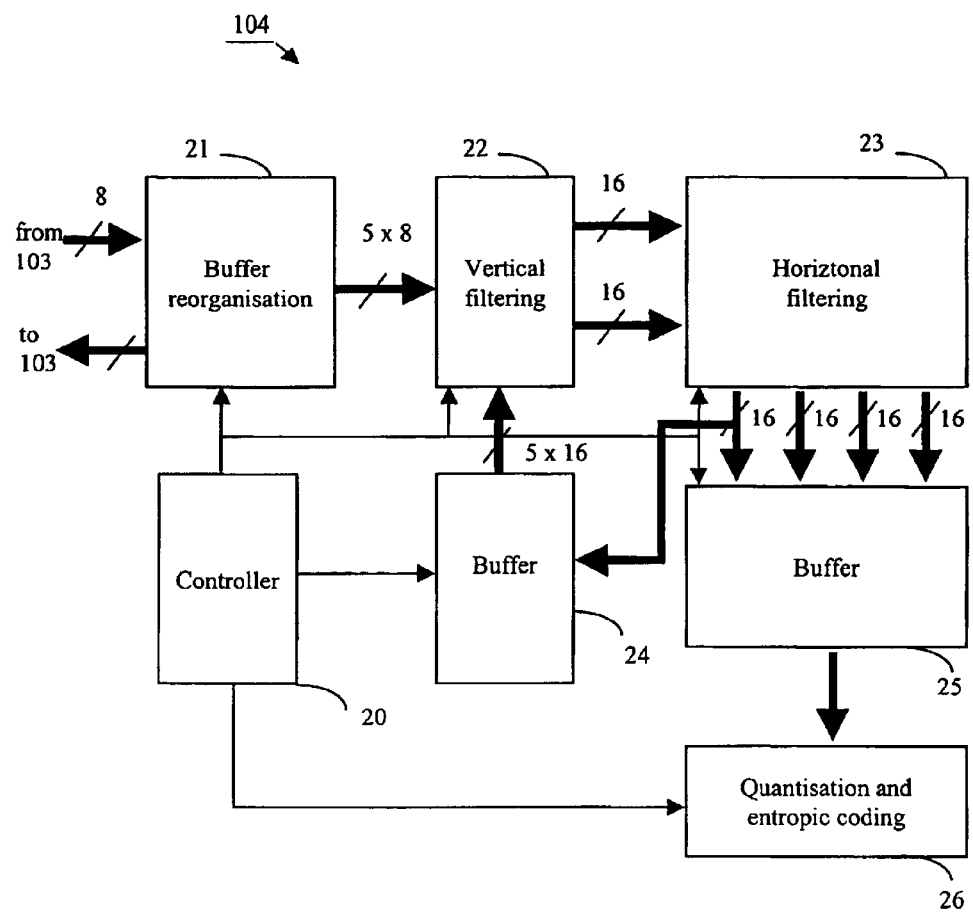
FIG. 4 depicts an embodiment of a coding circuit according to the invention included in the device of FIG. 2.

FIG. 4 depicts an embodiment of the coding circuit 104 according to the invention.

The circuit 104 includes:
- a controller 20 which controls the operation of the modules included in the circuit 104,
- a reorganisation buffer memory module 21,
- a vertical filtering module 22,
- a horizontal filtering module 23,
- a first buffer memory module 24,
- a second buffer memory module 25,
- an entropic coding and quantisation module 26.

The module 21 has data inputs and address outputs connected to the random access memory 103. The module 21 also has outputs connected to the vertical filtering module 22. The module 21 makes it possible to sequence the samples to be processed in a specific order and to store them before they are processed.

The vertical filtering module 22 effects a filtering in the vertical direction of the image and has outputs connected to the horizontal filtering module 23.

The horizontal filtering module 23 effects a filtering in the horizontal direction of the image and has outputs connected to the modules 24 and 25. Naturally, in an equivalent manner, the horizontal filtering module can be placed before the vertical filtering module.

The module 24 has an output connected to the vertical filtering module 22. The module 25 has outputs connected to the quantisation and entropic coding module 26.

The quantisation and entropic coding are conventional and will not be detailed here.

The modules 21, 22, 23, 24 and 25 are detailed hereinafter.

The operation of the circuit 104 is approximately as follows.

The filtering is effected by blocks of samples. In general terms, a block is a group of samples selected in the image. The blocks are here rectangular in shape, with an overlap between adjacent blocks which is zero or one row and/or one column of samples. All the blocks have the same number of samples, so that they are all filtered in an identical fashion.

For this, the samples of the image to be coded are read in the memory 103 in a fashion sequenced by the module 21, in the form of blocks which are then filtered in the two vertical and horizontal directions by the modules 22 and 23. Each block is thus analysed according to its frequencies so as to be transformed into four sub-blocks by the modules 22 and 23.

The analysis is then carried out on at least two resolution levels, that is to say the sub-blocks containing samples of low frequency in the two analysis directions, obtained at at least one first resolution level, are filtered in their turn by the modules 22 and 23. This looping is effected at least once. Each block of the initial image is analysed according to all the required resolution levels.

The sub-blocks which do not contain samples of low frequency in the two analysis directions obtained at the first resolution level are supplied to the module 25 and are then quantised and coded entropically by the module 26. The latter is adapted to process blocks of fixed predetermined size, chosen so as to be equal to that of the sub-blocks obtained at the first resolution level.

The blocks obtained at the lower resolution levels have sizes smaller than that required by the module 26. These blocks are consequently grouped so as to form blocks having the required size.

The sub-blocks containing samples of low frequency in the two analysis directions are supplied to the module 24, in order to effect the looping mentioned above, except for the last resolution level of the decomposition, where the sub-blocks are supplied to the module 25.

Figure 5:
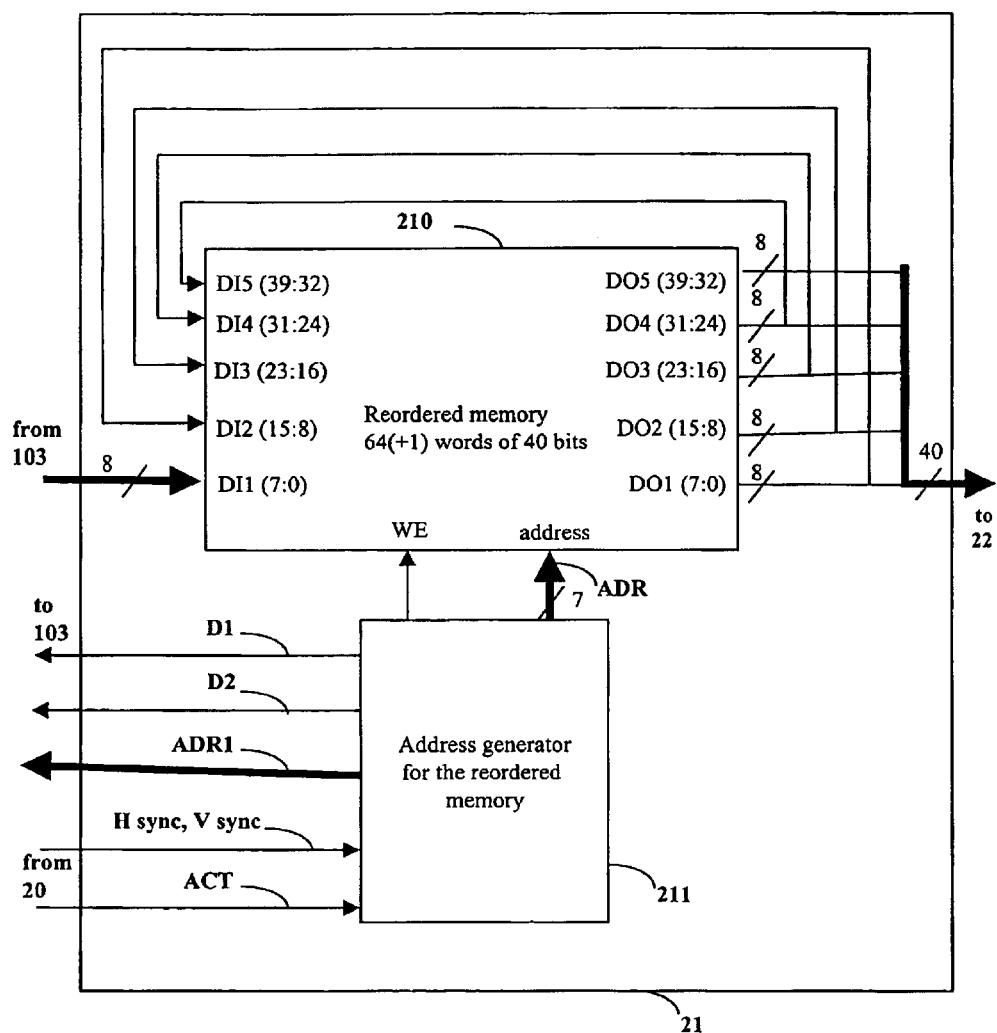
FIG. 5 depicts a memory module included in the coding circuit of FIG. 4.

FIG. 5 depicts the buffer memory module 21 for reorganising data in it. The circuit 21 makes it possible to read the data in an order predetermined in the original image.

Figure 6:
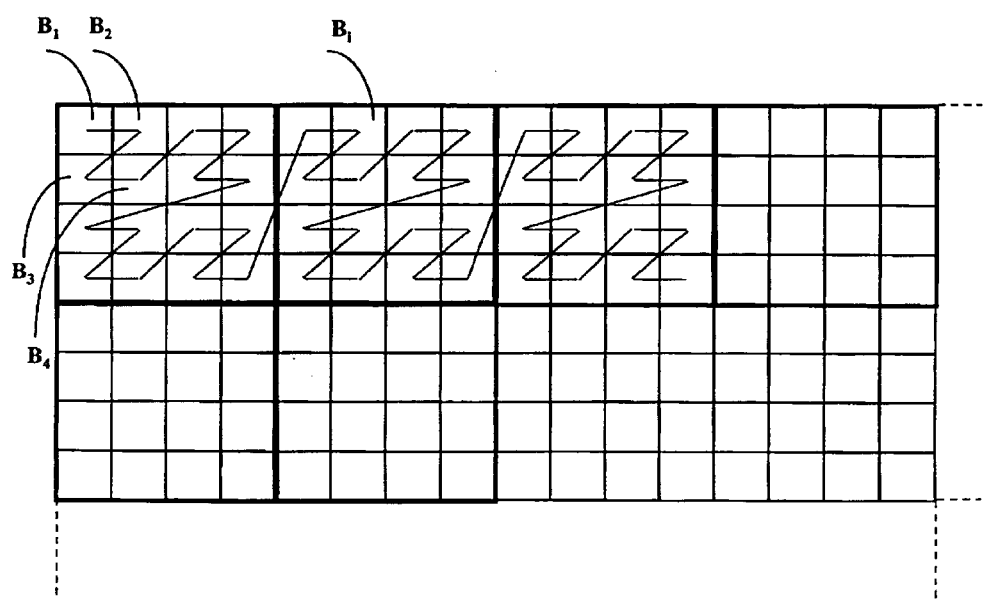
FIG. 6 depicts a part of an image to be coded according to the invention.

For example, FIG. 6 depicts part of the image to be coded. The filtering of the image is effected by blocks. Consequently the image is divided into blocks of samples $B_i$, where i is an integer which represents the rank of the block. By way of example, square blocks of size 64×64 samples are considered hereinafter. In addition, these blocks can overlap between adjacent blocks over a predetermined number of rows and/or over a predetermined number of columns. Hereinafter, the case will be dealt with where the overlap is of one row and one column, although larger overlaps are possible. Each block then includes (64(+1))×(64(+1)) samples. The advantage of the overlap between the adjacent blocks, and the questions of edge filtering, are disclosed in French patent applications 99 02303 and 99 02305.

Within a block, the samples are read in a predetermined order, for example in a zigzag scanning from the top left-hand corner to the bottom right-hand corner.

The blocks are themselves processed in an ordered fashion, in an order which minimises the memory occupation of the data currently being processed.

For example, for a decomposition of the image on three resolution levels, the blocks are considered and processed by groups of four adjacent blocks, such as the blocks $B_1$, $B_2$, $B_3$ and $B_4$.

The groups of four blocks are themselves considered in subgroups of four blocks, referred to as macroblocks.

The order of processing of the blocks for a decomposition of three resolution levels is depicted in FIG. 6 by a continuous line. The four blocks in a group are run through before passing to the following group. Likewise, a macroblock is totally run through before passing to the following macroblock. It should be noted that, within a group of four blocks, the blocks are processed in any order. Likewise, within a macroblock, the groups are processed in any order.

This order of processing makes it possible to filter the image by zones, at all resolution levels. Thus only the data of the current zone are kept in memory, and are filtered at all the required resolution levels.

It should be noted that the number of blocks included in a macroblock depends on the number of resolution levels. Thus one macroblock has 16 blocks for three resolution levels, 64 blocks for four resolution levels and 256 blocks for five resolution levels.

With reference once again to FIG. 5, the module 21 has a random access memory 210 and a reordered address generator 211.

The address generator 211 is controlled by the signals Hsync, Vsync and ACT supplied by the controller 20. The address generator 211 supplies an address signal ADR in seven bits to the random access memory 210 and controls the writing of the data in this memory by the signal WE.

The address generator 211 supplies an address signal ADR1 to the random access memory 103 and control signals D1 and D2. The data are read in the memory 103 in series of 64(+1) bytes.

The data are written in the memory 210 in accordance with a reading-modification-writing scheme. The memory 210 has five inputs DI1 to DI5 and five outputs DO1 to DO5. The input DI1 receives eight bits from the memory 103. The outputs DO1 to DO4 are respectively connected to the inputs DI2 to DI5. The memory 210 is thus a shift register having a depth of five bytes and a width of 64(+1) bytes.

The memory 210 supplies five bytes at a time to the vertical filtering module 22.

Figure 7:
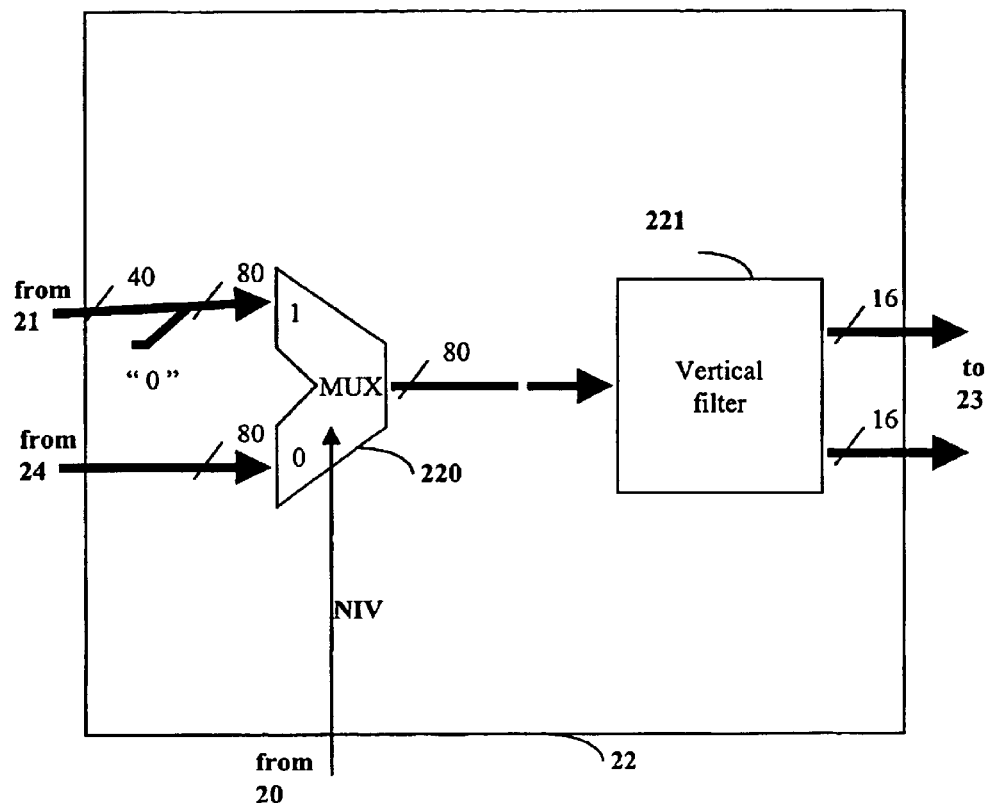
FIG. 7 depicts a vertical filtering module included in the coding circuit of FIG. 4.

With reference to FIG. 7, the vertical filtering module has a multiplexer 220 and a vertical filtering circuit 221.

A first input of the multiplexer 220 is connected to the module 21 whilst the second input of the multiplexer 220 is connected to the module 24, which will be described below. An output of the multiplexer 220 is connected to an input of the filtering circuit 221.

The controller 20 supplies a control signal NIV in order to indicate which is the resolution level of the data to be filtered. When the data of the original image are to be filtered, which corresponds to the highest resolution level, the multiplexer selects the data coming from the module 21. In this case, the five bytes are thus formed into five words each of sixteen bits, setting the unused bits to zero. Thus the format of the data to be filtered is compatible with the functioning of the circuit 221.

When data of a lower resolution level are to be filtered, the selected data are those coming from the module 24. These data are received in the form of five words each of sixteen bits.

The circuit 221 receives as an input five words each of sixteen bits and effects a wavelet filtering in so-called "lifting" form, as described for example in French patent application No 98 08824. The filter used here is a 5/3 filter. Other methods of effecting wavelet filtering are possible, for example by convolution. The circuit 221 supplies to the module 23 two flows each of sixteen bits, one of which includes low-frequency samples and the other high-frequency samples.

Figure 8:
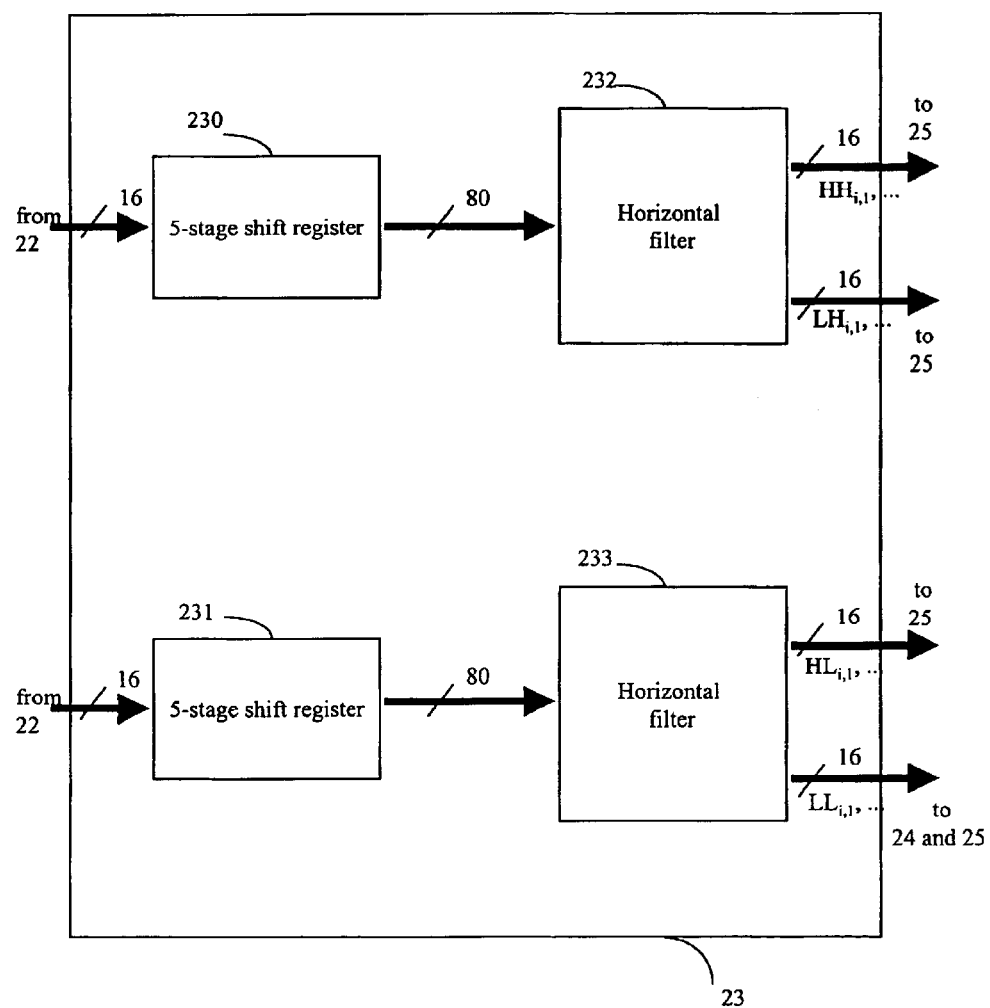
FIG. 8 depicts a horizontal filtering module included in the coding circuit of FIG. 4.

FIG. 8 depicts the horizontal filtering module 23 which has two shift registers 220 and 231 and two filtering circuits 232 and 233.

The shift register 230 receives the high-frequency samples from the module 22, forms five words each of 16 bits and applies them to the filtering circuit 232. The latter, similar to the filtering circuit 221, works here on 80 input bits and effects a wavelet filtering in the horizontal direction and supplies as an output two flows each of 16 bits.

One of these flows has samples of high frequency in the two analysis directions and the other samples of high frequency in the vertical direction and samples of low frequency in the horizontal direction.

In a similar fashion, the shift register 231 receives the low-frequency samples from the module 22, forms five words each of 16 bits and applies them to the filtering circuit 233. The latter, similar to the filtering circuit 232, works here on 80 input bits and effects a wavelet filtering in the horizontal direction and supplies as an output two flows each of 16 bits.

One of these flows includes samples of low frequency in the two analysis directions and the other samples of low frequency in the vertical direction and samples of high frequency in the horizontal direction.

The module 23 thus has four outputs connected to four inputs of the memory module 25. The outputs supplying the flow of samples of low frequency in the two analysis directions is also connected to the memory module 24.

The filtering of a block $B_i$, of size of $(64(+1)) \times (64(+1))$ samples thus results, at the first decomposition level, in four blocks $L_{i,1}$, $LH_{i,1}$, $HL_{i,1}$ and $HH_{i,1}$. The block $LL_{i,1}$ has a size of $(32(+1)) \times (32(+1))$ samples, whilst the blocks $LH_{i,1}$, $HL_{i,1}$ and $HH_{i,1}$ each have a size of 32×32 samples.

The block $LL_{i,1}$ contains samples of low frequency in the two analysis directions, the block $LH_{i,1}$ contains samples of high frequency in a first analysis direction and of low frequency in the other analysis direction, the block $HL_{i,1}$ contains samples of low frequency in the first analysis direction and of high frequency in the other analysis direction and the block $HH_{i,1}$ contains samples of high frequency in the two analysis directions.

When the block $LL_{i,1}$ is in its turn filtered, this gives four blocks $LL_{i,2}$, $LH_{i,2}$, $HL_{i,2}$ and $HH_{i,2}$ at the second resolution level. The block $LL_{i,2}$ has a size of $(16(+1)) \times (16(+1))$ samples and the blocks $LH_{i,2}$, $HL_{i,2}$ and $HH_{i,2}$ each have a size of 16×16 samples.

The block $LL_{i,2}$ can in its turn be filtered, and so on.

The blocks which contain samples of low frequency in one analysis direction have, at each decomposition level, an overlap in this analysis direction which is divided by two compared with the previous level, and then rounded up. The blocks which contain samples of high frequency in one analysis direction have, at each decomposition level, an overlap in this analysis direction which is divided by two compared with the previous level, and then rounded down. The overlap of the blocks which contain samples of high frequency in at least one analysis direction is eliminated. The overlap of the blocks which contain samples of low frequency in the two analysis directions is eliminated only at the end of the last decomposition level.

Figure 9:
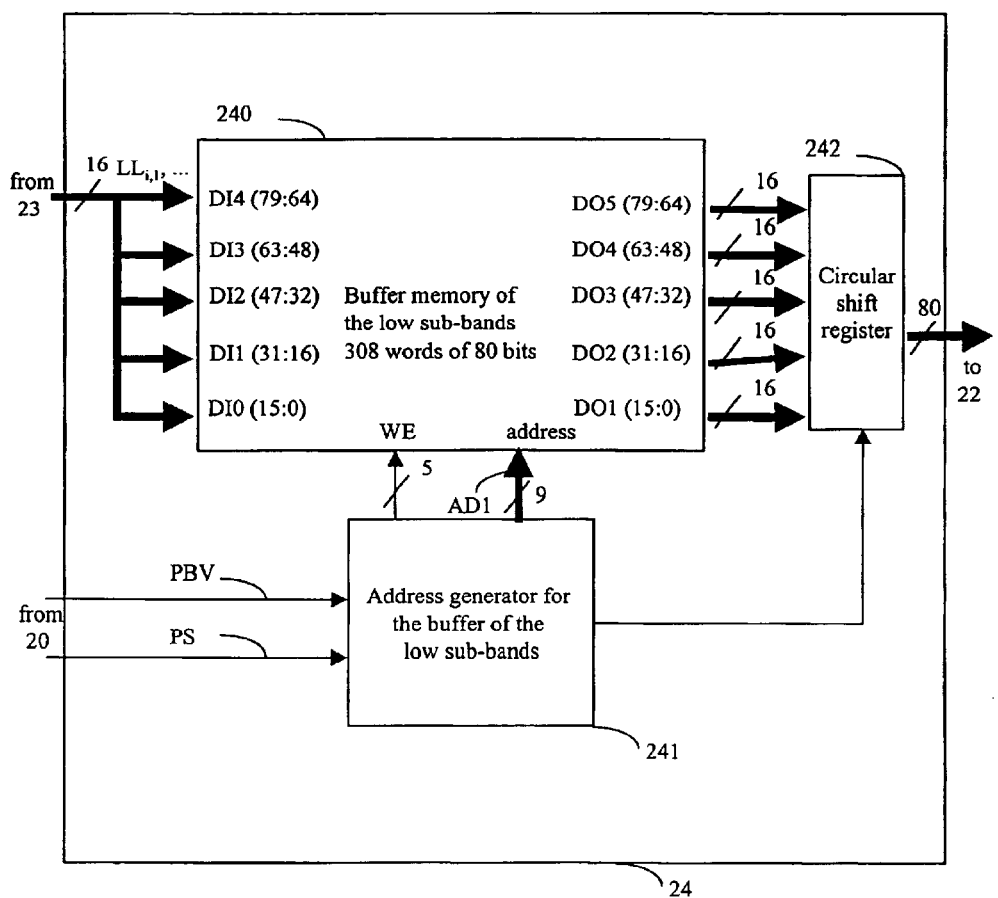
FIG. 9 depicts a buffer module included in the coding circuit of FIG. 4.

FIG. 9 depicts the buffer memory module 24, which has a buffer memory 240, an address generator 241 and a circular shift register 242.

The address generator 241 receives control signals from the controller 20. The signal PBV indicates that the data on the input bus are valid. The signal PS indicates which resolution level is currently being processed.

The address generator 241 supplies a write control signal WE to the memory 240, and an address signal AD1. The addresses are here expressed in nine bits.

The memory 240 receives the low-frequency sub-bands resulting from the decomposition of the blocks by the filtering modules 22 and 23, except for the lowest resolution level, since the data of this last decomposition level are not analysed.

Figure 10:
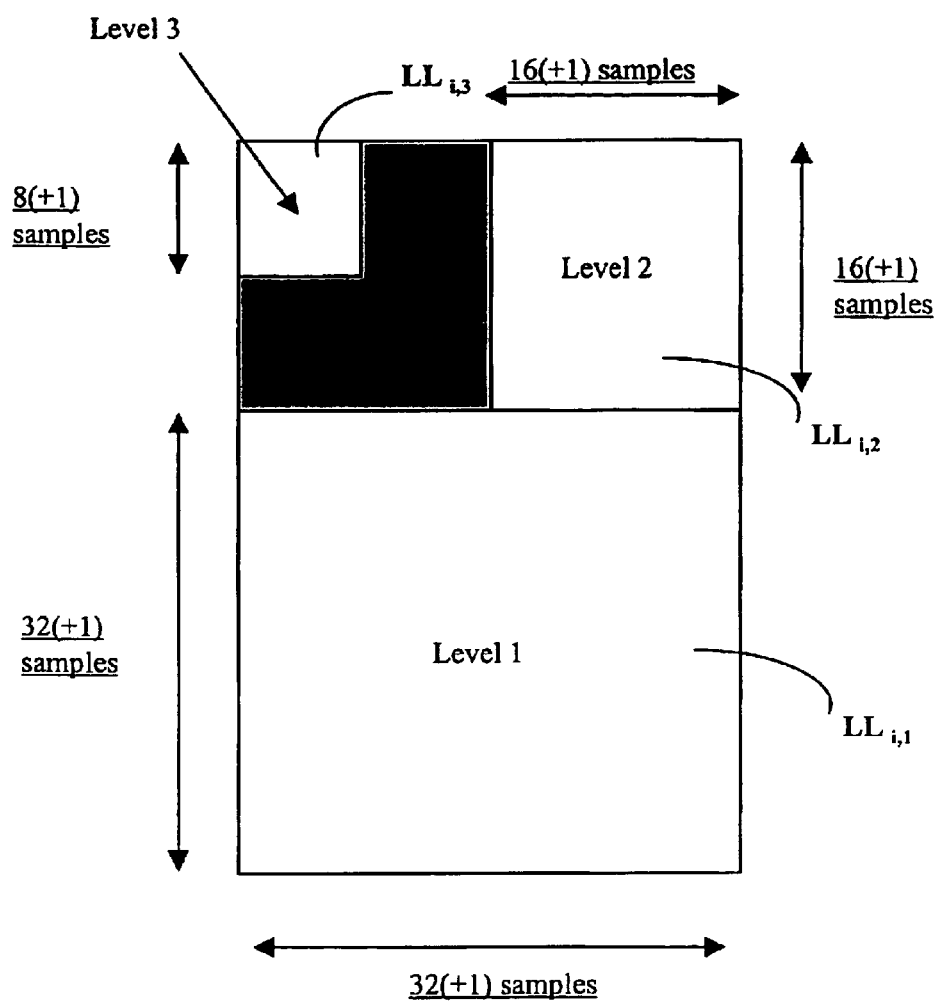
FIG. 10 depicts data stored in the buffer memory of FIG. 9.

FIG. 10 illustrates the organisation of the memory 240. For a decomposition at four levels of a block $B_i$, the memory 240 contains three areas for storing the low-frequency sub-bands $LL_{i,1}$, $LL_{i,2}$ and $LL_{i,3}$ resulting from the decomposition of the blocks by the filtering modules 22 and 23. The size of the memory is therefore related to the number of decomposition levels.

Thus a first area has the capacity to store the block $LL_{i,1}$ containing the samples of low frequency at the first resolution level, that is to say (32(+1))×(32(+1)) samples. A second area has the capacity to store the block $LL_{i,2}$ containing the samples of low frequency at the second resolution level, that is to say (16(+1))×(16(+1)) samples. Finally, a third area has the capacity to store the block $LL_{i,3}$ containing the samples of low frequency at the third resolution level, that is to say (8(+1))×(8(+1)). All the samples are expressed in sixteen bits.

It is not necessary to store in the memory 240 the block containing the samples of low frequency at the fourth and last resolution level, since this block is directly quantised and coded entropically.

As a variant, the memory 240 can have a smaller size. This is because, after the filtering of the block $LL_{i,1}$ in order to supply the block $LL_{i,2}$, the blocks $LL_{i,1}$ is no longer necessary. The block $LL_{i,2}$ can therefore be written in place of the block $LL_{i,1}$. Likewise, after the filtering of the block $LL_{i,2}$ in order to supply the block $LL_{i,3}$ the block $LL_{i,2}$ is no longer necessary. The block $LL_{i,3}$ can therefore be written in place of the block $LL_{i,2}$. In this case, the memory 240 has the capacity to store the largest of the blocks $LL_{1,1}$, $LL_{i,2}$ and $LL_{i,3}$.

Figure 11:
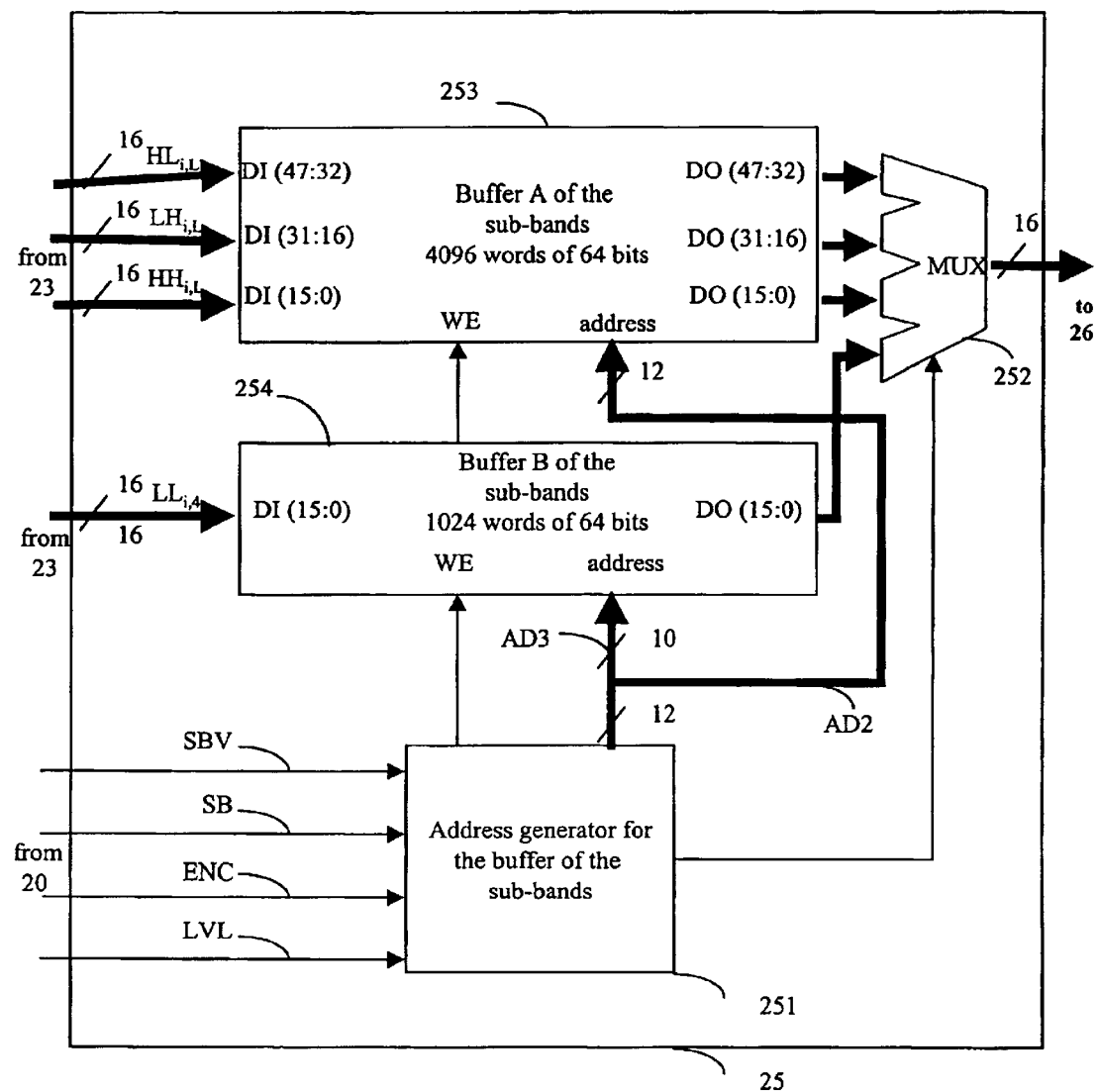
FIG. 11 depicts a buffer module included in the coding circuit of FIG. 4.

FIG. 11 depicts the buffer memory module 25, which has an address generator 251, a multiplexer 252, a first buffer 253 and a second buffer 254.

The address generator 251 receives control signals from the controller 20. The signal SBV controls the locking of the data in the memories 253 and 254. The signal SB indicates which sub-band is currently being processed. The signal ENC controls the output of the data from the memory 253 or 254 for the quantisation and entropic coding of the data. The signal LVL indicates which resolution level is currently being processed.

The address generator 251 supplies a write control signal WE to the memories 253 and 254, as well as two address signals AD2 and AD3. The addresses are here expressed in ten bits in the memory 254 and in twelve bits for the memory 253.

The memory 253 receives the blocks $LH_{i,L}$, $HL_{i,L}$ and $HH_{i,L}$ resulting from the decomposition of the current block $B_i$ at all the decomposition levels and stores them in memory. The blocks are grouped together according to their analysis orientation, so as to form grouping blocks of size 32×32, which corresponds to the size of the blocks which can be processed by the module 26.

For this, according to the example chosen, the memory 253 has a capacity to store, for each decomposition level, three grouping blocks each containing 32×32 samples expressed in 16 bits. For the first decomposition level, one of these blocks includes a block $LH_{i,1}$, another of these blocks includes a block $HL_{i,1}$ and the last block includes a block $HH_{i,1}$ For the second decomposition level, one of these blocks itself has four blocks $LH_{i,2}$, another of these blocks has four blocks $HL_{i,2}$ and the last block has four blocks $HH_{i,2}$. For the third decomposition level, one of these blocks itself has sixteen blocks $LH_{i,3}$, another of these blocks has sixteen blocks $HL_{i,3}$ and the last block has sixteen blocks $HH_{i,3}$. Finally, for the fourth decomposition level, one of these blocks itself has 64 blocks $LH_{i,4}$, another of these blocks has 64 blocks $HL_{i,4}$ and the last block has 64 blocks $HH_{i,4}$.

The memory 254 receives the block $LL_{i,4}$ resulting from the decomposition of the current block $B_i$ at the last decomposition level and stores it in memory. The memory 254 stores as many blocks $LL_{i,4}$ as necessary to form a block having a size compatible with the functioning of the module 26. For this, according to the example chosen, the memory 254 has a capacity to store at least one block having 32×32 samples expressed in 16 bits.

As a variant, the memory 254 can store blocks $LL_{i,4}$ to form a block with a size less than that of the grouping blocks of the higher resolution levels.

As an output, the multiplexer 252 receives a control signal from the address generator 251 and selects one of the four blocks of size 32×32 in order to transmit it to the module 26. The latter effects a quantisation and an entropic coding of the data which it receives.

Figure 12:
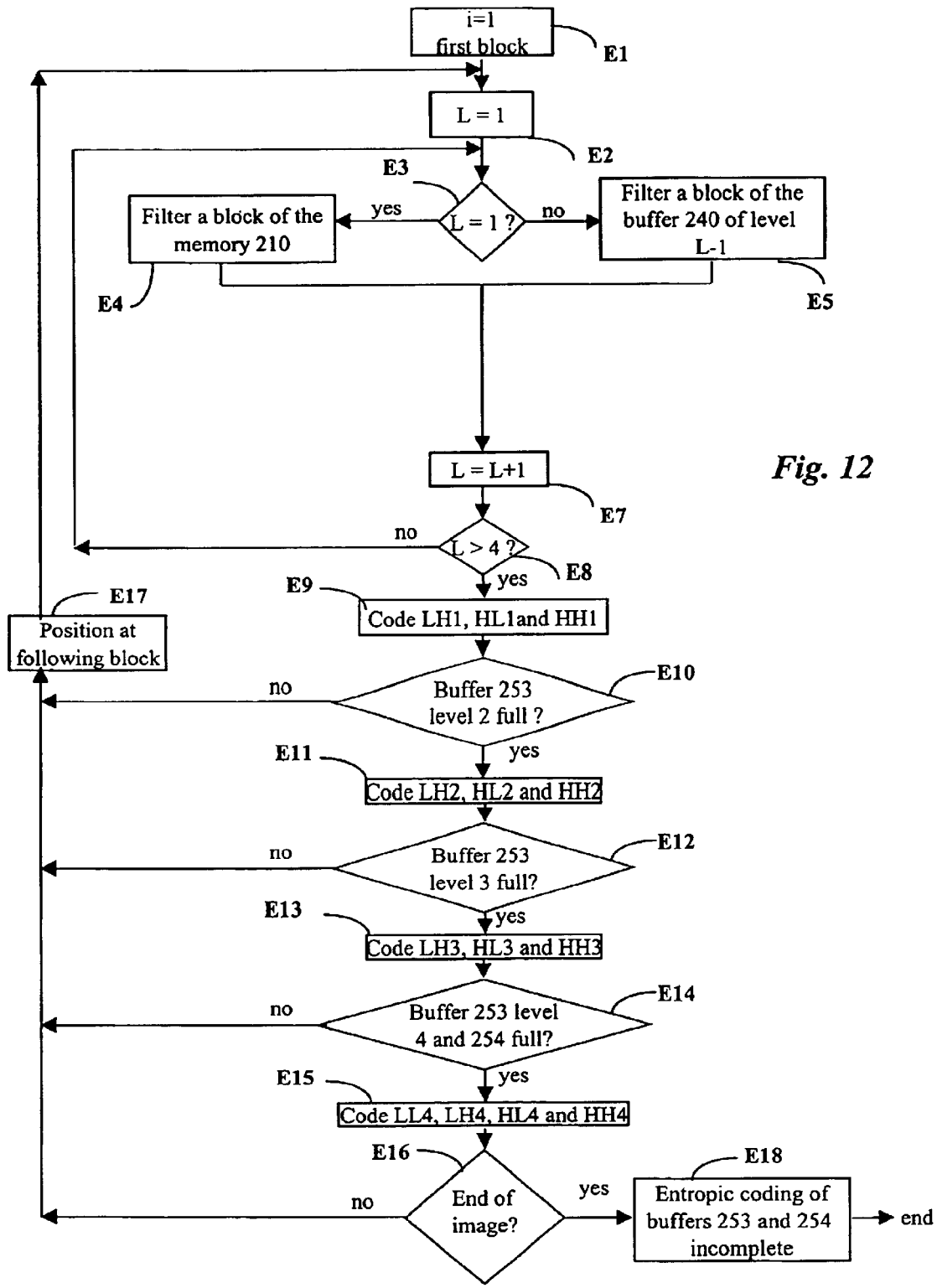
FIG. 12 depicts a data coding algorithm according to the invention.

FIG. 12 depicts a digital signal coding method according to the invention, which is implemented in the device depicted in FIG. 4, described above. The method is depicted in the form of an algorithm including steps E1 to E18. This method effects the filtering on four decomposition levels of an image, and the quantisation and entropic coding of the filtered data.

Step E1 is an initialisation at which a working parameter i is initialised to 1, in order to consider the first block of the image to be processed. The blocks are transformed in a predetermined order.

At the following step E2, a working parameter L is initialised to 1, in order to consider the first resolution level of the decomposition. The parameter L represents the current resolution level.

The following step E3 is a test for determining whether the current resolution level is the first. If the response is positive, then step E3 is followed by step E4, at which the block $B_i$ of rank i is read in the image memory 210, and is then filtered so as to form four blocks of sub-bands $LL_{i,1}$, $LH_{i,1}$, $HL_{i,1}$ and $HH_{i,1}$, at the first resolution level. The blocks $LL_{i,1}$, $HL_{i,1}$, and $HH_{i,1}$ are stored in the buffer 253 of the module 25, and the block $LL_{i,1}$ is stored in the buffer 240 of the module 24, as previously disclosed.

If the response is negative at step E3, then this step is followed by step E5, which is similar to step E4, except for the fact that the block is read in the buffer 240. The block read belongs to the resolution level immediately above the current level. At the last decomposition level, the block $LL_{i,4}$ is stored in the memory 254 of the module 25.

Steps E4 and E5 are both followed by step E7, at which the parameter L is incremented by one unit in order to consider the following resolution level.

Step E7 is followed by step E8, which is a test for determining whether the parameter L is strictly greater than 4. If the response is negative, then step E8 is followed by step E3.

This looping makes it possible to filter a block $B_i$ at all the desired resolution levels, here four levels.

If the response is positive at step E8, then this means that the current block has been decomposed at all the resolution levels. Step E8 is then followed by step E9, at which the blocks $LH_{i,1}$, $HL_{i,1}$ and $HH_{i,1}$ obtained at the first decomposition level are quantised and then entropically coded. These blocks have the size required by the module 26. These operations are conventional and will not be described here.

Step E9 is followed by step E10, which is a test for determining whether the memory 253 contains complete blocks LH2, HL2 and HH2 of size 32×32 containing respectively blocks $LH_{i,2}$, $HL_{i,2}$ and $HH_{i,2}$ obtained at the second resolution level. Complete block means a block whose size is appropriate for this block to be processed by the module 26.

If the response is negative, then the step is followed by step E17 for considering a following block in the original image. Step E17 is followed by the previously described step E2.

If the response is positive at step E10, then this step is followed by step E11, at which the previous complete blocks are quantised and then entropically coded.

Step E11 is followed by step E12, which is a test for determining whether the memory 253 contains complete blocks LH3, HL3 and HH3 of size 32×32 containing respectively blocks $LH_{i,3}$, $HL_{i,3}$ and $HH_{i,3}$ obtained at the third resolution level.

If the response is negative, then this step is followed by step E17 for considering a following block in the original image. Step E17 is followed by the previously described step E2.

If the response is positive at step E12, then this step is followed by step E13, at which the previous complete blocks are quantised and then entropically coded.

Step E13 is followed by step E14, which is a test for determining whether the memory 253 contains complete blocks LH4, HL4 and HH4 of size 32×32 containing respectively blocks $LH_{i,4}$, $HL_{i,4}$ and $HH_{i,4}$ obtained at the fourth resolution level and whether the memory 254 contains a complete block LL4 of size 32×32 containing blocks $LL_{i,4}$ obtained at the fourth resolution level.

If the response is negative, then this step is followed by step E17 for considering a following block in the original image. Step E17 is followed by the previously described step E2.

If the response is positive at step E14, then this step is followed by step E15, at which the previous complete blocks are quantised and then entropically coded.

Naturally, the number of steps such as the steps E10 to E15 depends on the number of resolution levels chosen.

Step E15 is followed by step E16, which is a test for determining whether all the image to be coded has been processed.

If the response is negative, then the step is followed by step E17, at which the parameter i is incremented by one unit in order to consider the following block in the image. Step E17 is followed by the previously described step E2.

When the response is positive at step E16, this step is followed by step E18, at which the buffers are emptied and any data which they may contain are quantised and coded. Coding of the image is then ended.

Naturally, the present invention is in no way limited to the embodiments described and depicted, but quite the contrary encompasses any variant within the capability of a person skilled in the art.

What is claimed is:

1. A method of transforming a digital signal representing a physical quantity into signals of frequency sub-bands distributed in at least two different frequency bands and in at least two different resolutions, comprising the steps of:
spatially dividing the signal into first blocks all having a same predetermined first number of samples,
transforming each of the first blocks into a plurality of second blocks by a space-frequency transformation, any second block under consideration having a second respective number of samples which depends on the resolution of the second block under consideration and which is inferior to a predetermined third number of samples, and containing samples selected according to their frequency, and
grouping second blocks having the same second number of samples and samples selected according to the same frequency band, and issuing from the transformation of spatially adjacent first blocks, in order to form third blocks all having the predetermined third number of samples.

2. The method according to claim 1, in which the transformation is a wavelet transformation.

3. The transformation method according to claim 1 or 2, in which the first blocks overlap in pairs on a fourth predetermined number of samples.

4. The method according to claim 1 or 2, in which the first blocks are processed in a predetermined order, such that the signal is transformed macroblock by macroblock, a macroblock of the signal being processed at all the resolution levels before passing to a following macroblock.

5. The method according to claim 4, in which a number of first blocks that form a zone is determined by a number of resolution levels to be applied.

6. The method according to claim 4, in which the predetermined order is a zigzag scan of groups of four adjacent blocks.

7. A method of coding a digital signal representing a physical quantity into signals of frequency sub-bands distributed in at least two different frequency bands and in at least two different resolutions, comprising the steps of:
spatially dividing the signal into first blocks all having a same predetermined first number of samples,
transforming each of the first blocks into a plurality of second blocks by a space-frequency transformation, any second block under consideration having a second respective number of samples which depends on the resolution of the second block under consideration and which is inferior to a predetermined third number of samples, and containing samples selected according to their frequency, and
grouping second blocks having the same second number of samples and samples selected according to the same frequency band, and issuing from the transformation of spatially adjacent first blocks, in order to form third blocks all having the predetermined third number of samples.

8. The method according to claim 7, in which the transformation is a wavelet transformation.

9. The method according to claim 7 or 8, in which the first blocks overlap in pairs on a fourth predetermined number of samples.

10. The method according to claim 7 or 8, in which the first blocks are processed in a predetermined order, such that the signal is transformed macroblock by macroblock, a macroblock of the signal being processed at all the resolution levels before passing to a following macroblock.

11. The method according to claim 10, in which a number of first blocks that form a zone depends on a number of resolution levels to be applied.

12. The method according to claim 10, in which the predetermined order is a zigzag scan of groups of four adjacent blocks.

13. The method according to claim 7 or 8, further comprising the steps of quantization and entropic coding of the transformed signal.

14. The method according to any one of claims 1, 2, 7, and 8, in which the digital signal is an image signal.

15. The method according to claim 7 or 8, further comprising steps of quantizing and entropic coding that are applied to each of the third blocks as soon as they are formed.

16. A device for transforming a digital signal representing a physical quantity into signals of frequency sub-bands distributed according to at least two different frequency bands and according to at least two different resolutions, comprising:
means for spatially dividing the signal into first blocks all having a same predetermined first number of samples, means for transforming each of the first blocks into a plurality of second blocks by a space-frequency transformation, any second block under consideration having a second respective number of samples which depends on the resolution of the second block under consideration and which is inferior to a predetermined third number of samples, and containing samples selected according to their frequency, and means for grouping second blocks having the same second number of samples and samples selected according to the same frequency band, and issuing from the transformation of spatially adjacent first blocks, in order to form third blocks all having the predetermined third number of samples.

17. The device according to claim 16, in which the transformation means are adapted to implement a wavelet transformation.

18. The device according to claim 16 or 17, in which the division means are adapted to form first blocks which overlap in pairs on a fourth predetermined number of samples.

19. The device according to claim 16 or 17, in which the division means are adapted to form first blocks which are adjacent.

20. The device according to claim 16 or 17, adapted to process the first blocks in a predetermined order, such that the signal is transformed macroblock by macroblock, a macroblock of the signal being processed at all the resolution levels before passing to a following macroblock.

21. A device for coding a digital signal representing a physical quantity into signals of frequency sub-bands distributed according to at least two different frequency bands and according to at least two different resolutions, comprising:

means for spatially dividing the signal into first blocks all having a same predetermined first number of samples, means for transforming each of the first blocks formed at the previous step into a plurality of second blocks by a space-frequency transformation, any second block under consideration having a second respective number of samples which depends on the resolution of the second block under consideration and which is inferior to a predetermined third number of samples, and containing samples selected according to their frequency, and means for grouping second blocks having the same second number of samples and samples selected according to the same frequency band, and issuing from the transformation of spatially adjacent first blocks, in order to form third blocks all having the predetermined third number of samples.

22. The device according to claim 21, in which the transformation means are adapted to implement a wavelet transformation.

23. The device according to claim 21 or 22, in which the division means are adapted to form first blocks which overlap in pairs on a fourth predetermined number of samples.

24. The device according to claim 21 or 22, in which the division means are adapted to form first blocks which are adjacent.

25. The device according to claim 21 or 22, wherein said device processes the first blocks in a predetermined order, such that the signal is transformed macroblock by macroblock, a macroblock of the signal being processed at all the resolution levels before passing to a following macroblock.

26. The device according to claim 21 or 22, further comprising means for the quantization and entropic coding of the transformed signal.

27. The device according to any one of claims 16, 17, 21, and 22, adapted to process a digital signal which is an image signal.

28. A digital apparatus including the device according to any one of claims 16, 17, 21, and 22.

29. The device according to any one of claims 16, 17, 21, and 22, such that the division, transformation and grouping means are incorporated in:

a controller, a read only memory containing a program for coding each of the blocks of data, and a random access memory containing registers adapted to record variables modified during the running of the program.

30. A digital apparatus including means of implementing the transformation method according to any one of claims 1, 2, 7, and 8.

31. The device according to any one of claims 16, 17, 21, and 22, such that the dividing, transforming, and grouping means are incorporated in:

a controller, a reorganization buffer memory module, a vertical filtering module, a horizontal filtering module, a first buffer memory module, a second buffer memory module, and an entropic coding and quantization module.

32. The device according to claim 31, in which the entropic coding and quantization module is adapted to process blocks of the predetermined third number of samples.

33. The device according to claim 31, in which the first buffer memory module is adapted to process low frequency sub-bands.

34. The device according to claim 31, in which the second buffer memory module is adapted to process the sub-bands that do not contain samples of low frequency in the two filtering directions.

* * * * *

UNITED STATES PATENT AND TRADEMARK OFFICE
CERTIFICATE OF CORRECTION

PATENT NO. : 6,891,895 B1  
APPLICATION NO. : 09/542920  
DATED : May 10, 2005  
INVENTOR(S) : Patrice Onno et al.

Page 1 of 1

It is certified that error appears in the above-identified patent and that said Letters Patent is hereby corrected as shown below:

COLUMN 3

Line 51, "signal," should read --the signal,--;
Line 57, "circuit 23" should read --circuit $2_3$--;
Line 58, "circuit 24." should read --circuit $2_4$.--;
Line 63, "circuit 23." should read --circuit $2_3$.--;
Line 64, "circuit 24" should read --circuit $2_4$--;
Line 65, "25, which" should read --$2_5$, which--; and
Line 67, "circuit 24." should read --circuit 24.--.

COLUMN 9

Line 41, "$HL_{i,L}$" should read --$HL_{i,L}$--.

Signed and Sealed this

Seventeenth Day of July, 2007

JON W. DUDAS
*Director of the United States Patent and Trademark Office*